United States Patent [19]

Sakashita et al.

[11] Patent Number: 5,735,038
[45] Date of Patent: Apr. 7, 1998

[54] MAGNET ASSEMBLING DEVICE

[75] Inventors: Hiroshi Sakashita; Masayuki Katagiri, both of Nagano, Japan

[73] Assignee: Kabushiki Kaisha Sankyo Seiki Seisakusho, Nagano, Japan

[21] Appl. No.: 495,105

[22] Filed: Jun. 27, 1995

[30] Foreign Application Priority Data

Jun. 27, 1994 [JP] Japan ................................ 6-168852

[51] Int. Cl.$^6$ ................................................ H02K 15/02
[52] U.S. Cl. ........................ 29/736; 29/596; 29/607; 29/732
[58] Field of Search ......................... 29/596, 732, 736, 29/607, 608

[56] References Cited

FOREIGN PATENT DOCUMENTS 61-269649  11/1986  Japan ................. H02K 21/06

*Primary Examiner*—Carl E. Hall
*Attorney, Agent, or Firm*—Sughrue, Mion, Zinn, Macpeak & Seas, PLLC

[57] ABSTRACT

A magnet assembling device includes a rounding die into which a rectangular and flexible rubber magnet can be mounted in an annular manner; a die guide for guiding the rubber magnet mounted in the rounding die into a motor case; a push punch including a punching portion for inserting the rubber magnet mounted in the rounding die into the die guide and for pushing the rubber magnet out of the die guide into the motor case; and a magnetizing head for magnetizing the inner peripheral surface of the rubber magnet. The die guide is formed in a tapered shape such that the inside diameter dimension of the side thereof from which the rubber magnet is inserted is larger than the inside diameter dimension of the side thereof from which the rubber magnet is discharged. Further, the magnetizing head is mounted on the push punch in such a manner that the magnetizing portion of the magnetizing head projects toward the rubber magnet beyond the punching portion of the push punch, and the magnetizing portion of the magnetizing head can be brought into close contact with the inner peripheral surface of the rubber magnet in the minimum diameter portion of the die guide.

2 Claims, 4 Drawing Sheets

MAGNET ASSEMBLING DEVICE

BACKGROUND OF THE INVENTION

The present invention relates to a device and method for assembling a magnet into a motor case or the like.

As a magnet assembling device which arranges a flexible rubber magnet into a ring shape and mounts the rubber magnet on a motor case or the like, there is known a device which is disclosed in Japanese Patent Unexamined Publication No. Sho. 61-269649. An example of such a magnet assembling device will be described with reference to accompanying drawings.

In FIG. 2, the magnet assembling device includes rollers 23, 23 for holding between them a rubber magnet 22, which is cut and machined into a rectangular shape, and for feeding the rubber magnet 22 into a rounding die 25, and a push rod 24 for pushing the rubber magnet 22 out of the rounding die 25 into a motor case 27.

On both sides of the rubber magnet 22 to be fed by the rollers 23, 23, there are disposed oil dispensers 28, 28 which are used to apply synthetic oil or mineral lubricating oil onto the two surfaces of the rubber magnet 22 while it is moving. On the other hand, in the central portion of the rounding die 25, there is formed a rounding hole 25a. If the rubber magnet 22 is pushed into the rounding hole 25a through a guide 26, then the rubber magnet 22 is rounded and reformed into an annular shape.

As shown in FIG. 3, the inside diameter of the rounding hole 25a on the motor case 27 side is set smaller than the inside diameter thereof onto which the rubber magnet 22 is to be mounted. Therefore, when the rubber magnet 22 mounted into the rounding hole 25a through the guide 26 is pushed in downwardly by the push rod 24, then the rubber magnet 22 is reformed in shape by the tapered rounding hole 25a and is thus gradually reduced in diameter, so that the rubber magnet 22 can be mounted into the motor case 27 disposed downwardly of the rounding die 25. In this case, since oil is previously applied to the two surfaces of the rubber magnet 22 by the oil dispensers 28, 28, the rubber magnet 22 can be moved smoothly from the rounding hole 25a into the motor case 27 so that the rubber magnet 22 cannot be damaged or distorted at all.

After the rubber magnet 22 is mounted into the motor case 27, the rubber magnet 22 is magnetized. When magnetizing the rubber magnet 22, as shown in FIG. 4, the motor case 27 is held in such a manner that the bottom portion thereof is located upside while the opening portion thereof is located downside, and a magnetizing head 29 is inserted from the downside opening portion and the outer periphery of the magnetizing head 29 is disposed on the inner periphery side of the rubber magnet 22.

However, in the above-mentioned conventional magnetizing method, in which, after the rubber magnet 22 is mounted in the motor case 27, the magnetizing head 29 is inserted from the opening portion side of the motor case 27 and then the rubber magnet 22 is magnetized, there are still left some problems to be solved.

For example, when the magnetizing head 29 is inserted into the motor case 27 with the rubber magnet 22 mounted thereon, for the smooth insertion of the magnetizing head 29, there is provided a given clearance between the outer peripheral surface of the magnetizing head 29 and the inner peripheral surface of the rubber magnet 22. However, if the clearance is too small, then the outer peripheral surface of the magnetizing head 29 is brought into contact with the inner peripheral surface of the rubber magnet 22 and, if worst comes to worst, the magnetizing head 29 can scrape the inner peripheral surface of the rubber magnet 22 to thereby produce cuts, burrs and the like on the inner peripheral surface of the rubber magnet 22. Such cuts, burrs and the like adhere to the inner peripheral surface of the rubber magnet 22 after the rubber magnet 22 is magnetized, and thus they are brought into contact with a rotor, stator and the like to thereby have an ill effect on the rotational performance of a motor.

In order to avoid the contact between the magnetizing head 29 and the inner peripheral surface of the rubber magnet 22, if the clearance between the inner peripheral surface of the rubber magnet 22 and the outer peripheral surface of the magnetizing head 29 is increased, then the mounting position with respect to a jig of the motor case 27 is shifted so that, as shown in FIG. 5, the position of the magnetizing head 29 is shifted from the center of the annular rubber magnet 22. As a result of this, the clearance becomes uneven over the whole periphery and the magnetizing strength also becomes uneven.

Here, in the motor case 27 shown in FIG. 5, the N pole magnetizing portion 29a of the magnetizing head 29 is situated near the rubber magnet 22 side and, on the other hand, the S pole magnetizing portion 29b thereof is situated remote from the rubber magnet 22 side, so that the clearance is uneven over the whole periphery. In this state, as shown in FIG. 6, the rubber magnet 22 was magnetized so that the butting surface between the end portions 22a and 22b of the rubber magnet 22 provides the boundary between the N and S poles, and the distribution of magnetic fluxes ranging from the end portion 22a on the N pole side to the end portion 22b on the S pole side was measured, with the result that a graph shown in FIG. 7 was obtained.

In the graphical representation shown in FIG. 7, since the N pole magnetizing portion 29a is situated near the rubber magnet 22 side in FIG. 5, an angle θ0 of the N pole magnetized portion is greater than an angle θ1 of the S pole magnetized portion. This shows that, if the clearance is uneven over the whole periphery, then the magnetic poles formed vary in intensity from each other which results in the uneven distribution of the magnetic fluxes. The uneven distribution of the magnetic fluxes has an ill effect on the rotational performance of a motor to which the rubber magnetic 22 of this type is applied.

Further, since there exists a given clearance between the magnetizing head 29 and rubber magnet 22, this clearance impedes the magnetization of the rubber magnet 22. In fact, in one case, the rubber magnet 22 was magnetized in such a manner that the magnetizing head 29 was in close contact with the rubber magnet 22; and, in the other case, the rubber magnet 22 was magnetized with a clearance existing between the rubber magnet 22 and magnetizing head. When the magnetic forces of the rubber magnet 22 after magnetized in the two cases were compared with each other, the resultant values are shown in FIG. 8. As shown in FIG. 8, when compared with the magnetic force values obtained in the close contact magnetization and shown by a one-dot chained line, the magnetic force values obtained in the clearance magnetization and shown by a solid line are smaller by several percent almost over the whole range. This proves that the clearance impedes the magnetization of the rubber magnet 22.

SUMMARY OF THE INVENTION

The present invention has been made to eliminate the above-mentioned drawbacks found in the conventional magnet assembling device and method. Accordingly, it is an object of the invention to provide magnet assembling device and method which can magnetize a rubber magnet without damaging the same in such a manner that the magnetized rubber magnet can provide a uniform distribution of magnetic fluxes.

According to the present invention, there is provided a magnet assembling device, comprising: a rounding die into which a rectangular and flexible rubber magnet can be mounted in an annular manner; a die guide for guiding the rubber magnet mounted in the rounding die into a motor case; a push punch including a punching portion for inserting the rubber magnet mounted in the rounding die into the die guide and for pushing the rubber magnet out of the die guide into the motor case; and a magnetizing head for magnetizing the inner peripheral surface of the rubber magnet, wherein the die guide is formed in a tapered shape such that the side thereof from which the rubber magnet is inserted is larger in the inside diameter dimension than the portion thereof from which the rubber magnet is discharged, and also wherein the magnetizing head is mounted on the push punch in such a manner that the magnetizing portion of the magnetizing head projects toward the rubber magnet beyond the punching portion of the push punch, and the magnetizing portion of the magnetizing head can be brought into close contact with the inner peripheral surface of the rubber magnet in the minimum diameter portion of the die guide.

In the magnetic assembling device, the inside diameter dimension of the minimum diameter portion of the die guide is set slightly smaller than the inside diameter dimension of the portion of the motor case for mounting the rubber magnet.

Further, according to the present invention, there is provided a magnet assembling method which comprises at least the following steps of: mounting a rectangular and flexible rubber magnet into a rounding die in an annular manner; inserting a magnetizing head into the central portion of the rubber magnet mounted in the rounding die in an annular manner, and pressing a punching portion of a push punch against the edge portion of the rubber magnet to thereby push the rubber magnet into a die guide; decreasing gradually the diameter dimension of the rubber magnet with the inner peripheral surface of the die guide while pushing the rubber magnet into the die guide with the punching portion; magnetizing the magnet when the rubber magnet is brought, into close contact with the outer peripheral surface of the magnetizing head in the minimum diameter portion of the die guide; and pushing the rubber magnet out of the die guide and assembling the same into the motor case.

The magnetizing head is mounted on the leading end portion of the punching portion of the push punch and the rubber magnet, which is previously held in the rounding die in such manner that it is arranged in a substantially annular shape, is pushed into the die guide with the punching portion of the push punch. When the rubber magnet is decreased in diameter along the inside diameter shape of the die guide and is brought into close contact with the outer peripheral surface of the magnetizing head in the minimum diameter portion of the die guide, the magnet is magnetized in this close contact condition. After it is magnetized, the rubber magnet is pushed out of the die guide into the motor case with the punching portion of the push punch. In this operation, when the rubber magnet is discharged out of the die guide, it expands due to its own elastic force and is thus removed from its close contact with the magnetizing head. Due to this, the rubber magnet can be mounted to the motor case in such a manner that the magnetized surface of the rubber magnet is prevented against damage.

DETAILED DESCRIPTION OF THE INVENTION

Figure 1:
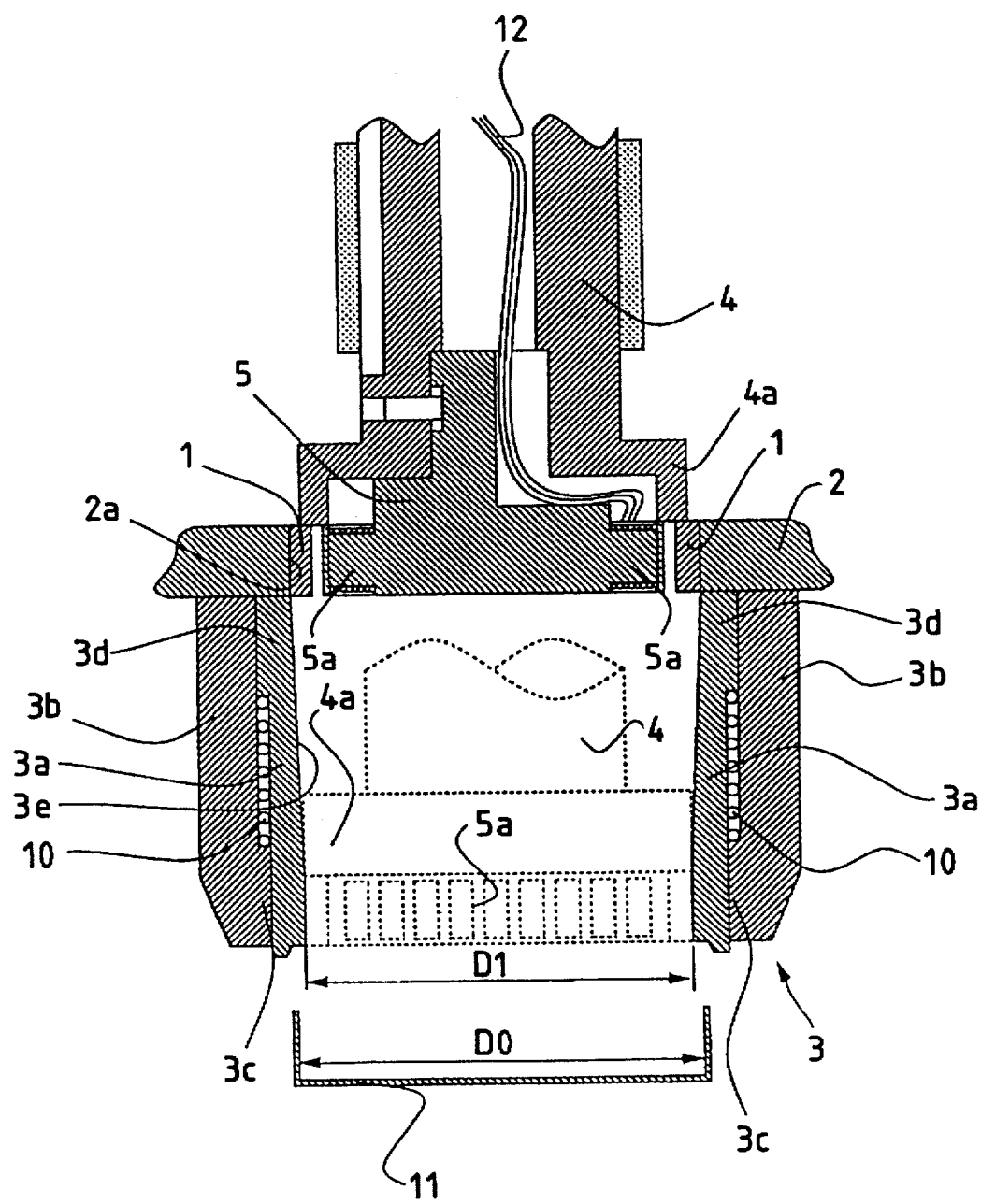
FIG. 1 is a sectional view of an embodiment of a magnet assembling device according to the invention.
Figure 2:
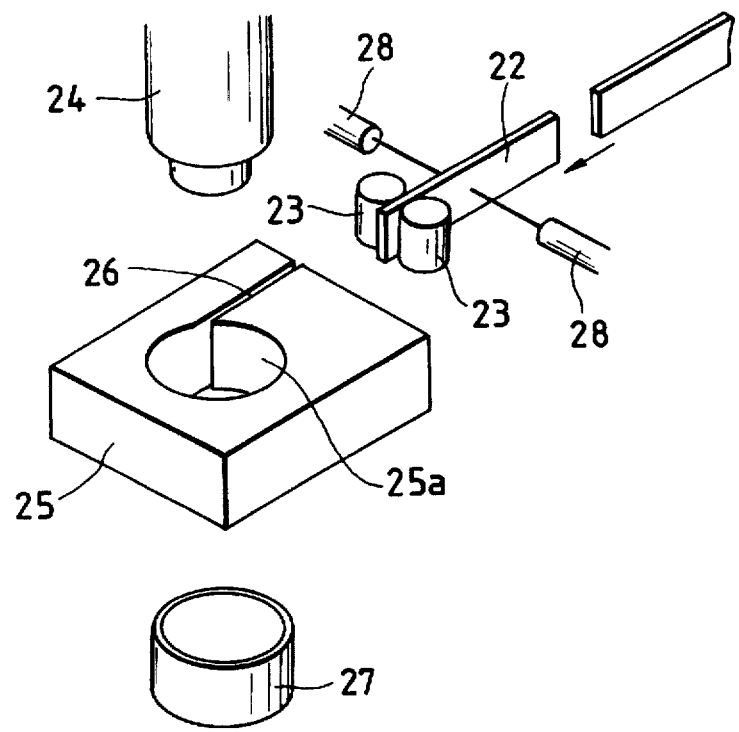
FIG. 2 is a perspective view of a conventional magnet assembling device.
Figure 3:
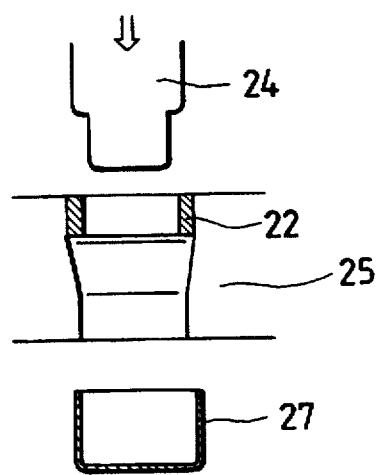
FIG. 3 is a sectional view of the main portions of the conventional device.
Figure 4:
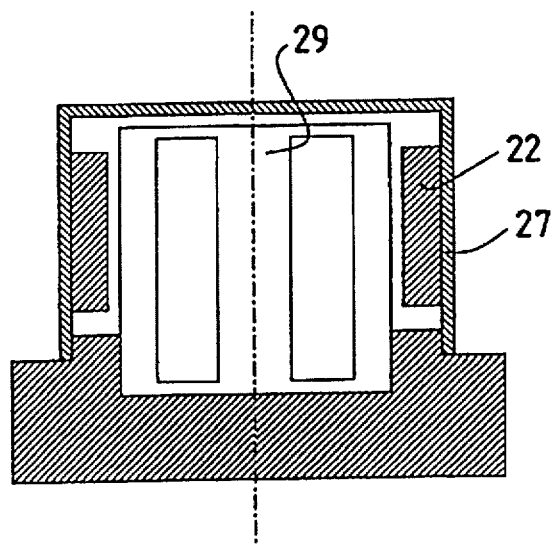
FIG. 4 is a longitudinal sectional view of the conventional magnet assembling device, showing how to magnetize a magnet.
Figure 5:
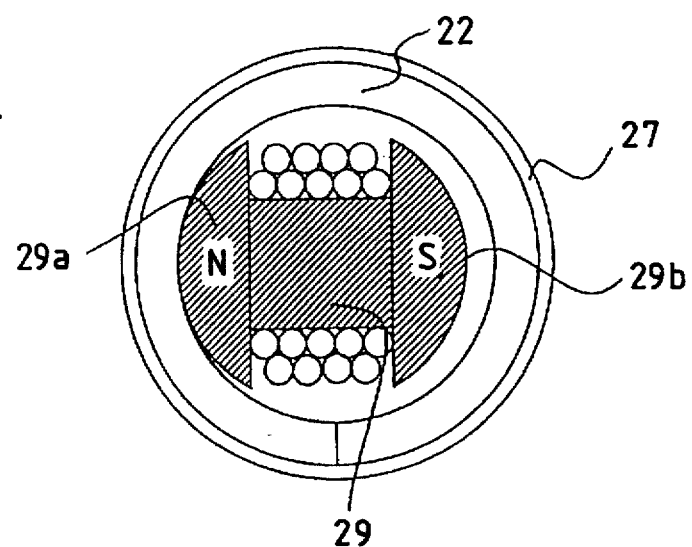
FIG. 5 is a transverse sectional view of the conventional magnet assembling device.
Figure 6:
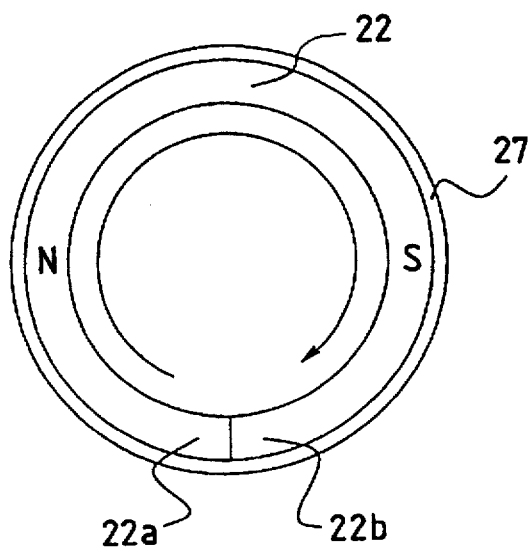
FIG. 6 is a plan view of the conventional magnet assembling device, showing a state thereof in which the magnetization of the magnet is completed.
Figure 7:
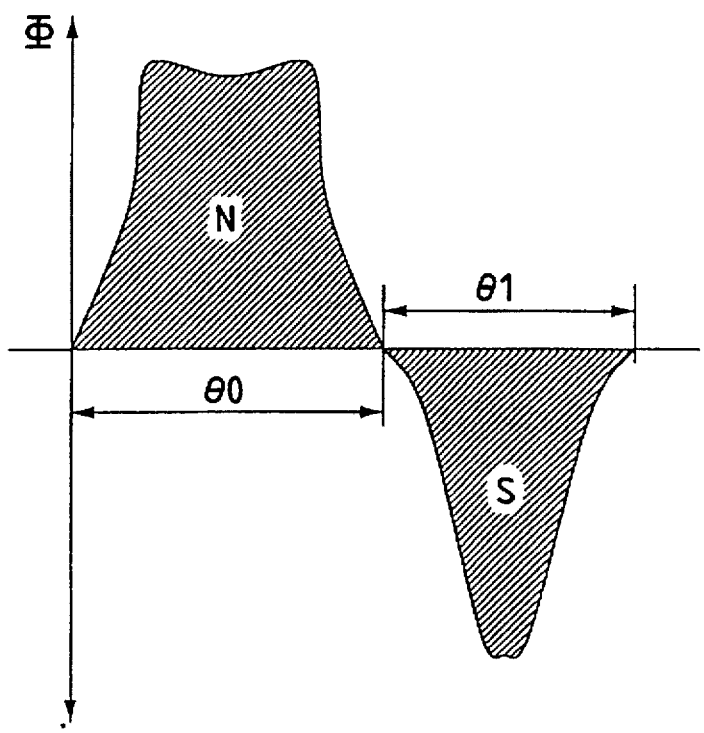
FIG. 7 is a waveform view of a magnetic force distribution provided by the magnet magnetized by the conventional magnet assembling device; and, FIG. 8 is a waveform view of magnetic force distributions provided by the conventional magnet, showing the comparison of the magnetic force distributions respectively provided when the magnet is magnetized with and without a clearance between the magnet and magnetizing head.
Figure 8:
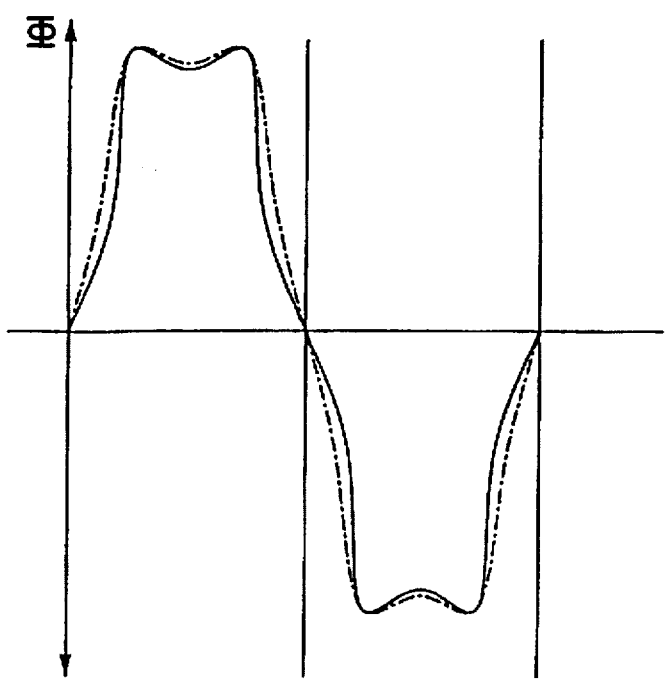

Now, an embodiment of a magnet assembling device and a magnet assembling method according to the invention will be described with reference to the accompanying drawings. In FIG. 1, a rounding die 2 includes in the central portion thereof a hole 2a for holding therein a rectangular and flexible rubber magnet 1. The rounding die 2 shown in FIG. 1 is substantially identical in structure with the rounding die previously described in connections with FIG. 2, and includes the hole 2a and a guide which is in communication with the hole 2a.

A die guide 3 is mounted on the lower side of the rounding die 2. The die guide 3 includes a holder 3b and a cylindrical guide portion 3a mounted on the inside of the holder 3b. Also, the die guide 3 includes a stepped portion 3c which is formed in the lower portion of the inner peripheral surface of the holder 3b, and an eaves-like projecting portion 3d which is provided over the whole upper portion of the outer peripheral surface of the guide portion 3a. The stepped portion 3c of the holder 3b and the projecting portion 3d the guide portion 3a are superimposed vertically on each other with a clearance between them, and a spring 10 is mounted in the clearance which exists between the stepped portion 3c and the projecting portion 3d. One end of the spring 10 is in contact with the lower end face of the projecting portion 3d, while the other end of the spring 10 is in contact with the upper end face of the stepped portion 3c. The guide portion 3a is always energized upwardly with respect to the holder 3b by the spring 10.

Also, a hole 3e, which is formed in the central portion of the guide portion 3a, is in communication with the hole 2a formed in the rounding die 2. The hole 3e shows a tapered shape such that the inside diameter dimension thereof on the rounding die 2 side (in FIG. 1, on the upper side) is larger than the inside diameter dimension thereof on the opposite side to the rounding die 2. However, the portion of the central hole 3e that has the smallest inside diameter dimension, that is, the minimum diameter portion of the hole 3e is not tapered but is straight by a distance equal to the width dimension of the rubber magnet 1.

On the other hand, on the upper side of the rounding die 2, there is disposed a push punch 4 which is movable in the vertical direction. The push punch 4 includes a peripheral-wall-like punching portion 4a in the end portion thereof on the rounding die 2 side. A magnetizing head 5 is mounted on the inside of the punching portion 4a of the push punch 4. The leading end portion of the magnetizing head 5 provides a magnetizing portion 5a which is projecting downwardly of the punching portion 4a of the push punch 4 by a distance equal to the width dimension of the rubber magnet 1. A cable 12 for power supply is connected to the magnetizing head 5.

Below the die guide 3, there is disposed a motor case 11 in which the rubber magnet 1 is to be mounted. When the diameter dimension of the minimum diameter portion of the die guide 3 designated by reference character D1 is compared with the inside diameter dimension D0 of the portion of the motor case 11 to which the rubber magnet 1 is to be mounted, the diameter dimension of the minimum diameter portion of the die guide, namely, D1 is smaller slightly (of the order of 0.05 to 0.5 mm) than D0.

Next, an embodiment of a magnet assembling method using a magnet assembling device structured in the above-mentioned manner will be described.

At first, a rectangular rubber magnet 1, which is cut formed to a proper dimension, is shaped into an annular shape and is then set on the inner peripheral surface of the central hole 2a formed in the rounding die 2.

Secondly, the push punch 4 disposed considerably upwardly of the rounding die 2 is moved down, whereby the magnetizing portion 5a of the magnetizing head 5 is inserted into the inner periphery of the rubber magnet 1 set in the rounding die 2 and the punching portion 4a of the push punch 4 is pressed against the upper end face of the rubber magnet 1. Since the diameter of the rubber magnet 1 is larger than the diameter of the punching portion 4a of the push punch 4, the lower end face of the punching portion 4a is pressed against the portion of the upper end face of the rubber magnet 1 that is located near the inner periphery thereof.

Thirdly, the push punch 4 is further moved down to thereby push the rubber magnet 1 into the die guide 3.

Next, the push punch 4 is moved down still further to thereby move the rubber magnet 1 downwardly within the die guide 3. Since the guide portion 3a of the die guide 3 into which the rubber magnet 1 is inserted is tapered, as the rubber magnet 1 moves downwardly, the rubber magnet 1 is gradually compressed and thus the diameter dimension thereof is decreased accordingly.

When the rubber magnet 1 reaches the minimum diameter portion of the die guide 3, then the inner peripheral surface of the rubber magnet 1 is brought into close contact with the outer peripheral surface of the magnetizing portion 5a of the magnetizing head 5. In this close contact state, the coil of the magnetizing head 5 is energized and the rubber magnet 1 is magnetized from the inner peripheral side thereof.

After the rubber magnet 1 is magnetized, the push punch 4 is lowered further to thereby push the rubber magnet 1 out of the die guide 3 into the motor case 11. Because the dimension D1 of the minimum diameter portion of the die guide 3 is slightly smaller than the inside diameter dimension D0 of the motor case 11, the rubber magnet 1 can be smoothly assembled into the motor case 11. This completes the assembling of the rubber magnet 1 into the motor case 11.

According to the magnet assembling device having the above-mentioned structure, since the rubber magnet 1 can be brought into close contact with the outer peripheral surface of the magnetizing portion 5a of the magnetizing head 5 in the minimum diameter portion of the die guide 3, the rubber magnet 1 can be magnetized with no clearance existing between the magnetizing head 5 and rubber magnet 1. For this reason, the rubber magnet 1 can be magnetized in such a manner that it provides a uniform magnetic flux distribution. Also, since no clearance is produced between the magnetizing head 5 and the rubber magnet 1 when the rubber magnet 1 is magnetized, no loss of magnetization is produced and the thus magnetized rubber magnet 1 can have a sufficient magnetic force.

Also, since the diameter dimension of the minimum diameter portion of the die guide 3 is set smaller than the inside diameter dimension of the motor case 11, the rubber magnet 1 can be smoothly inserted from the minimum diameter portion of the die guide 3 into the motor case 11. And, because the rubber magnet 1 can be expanded toward the outer periphery side thereof due to its own elastic force and thus can be detached from the magnetizing portion 5a at the instant the rubber magnet 1 is discharged out of the die guide 3 and mounted into the motor case 11, the rubber magnet 1 can be mounted in such a manner that it is prevented against damage such as cuts, burrs or the like which can be caused by the magnetizing head 5.

As described above, according to the present invention, the die guide is formed in a tapered shape such that the inside diameter dimension of the side thereof for insertion of the rubber magnet is larger than that of the side thereof for discharge of the rubber magnet, the magnetizing head is mounted on the push punch in such a manner that the magnetizing portion of the magnetizing head projects toward the rubber magnet beyond the punching portion of the push punch, and the magnetizing portion of the magnetizing head can be brought into close contact with the inner peripheral surface of the rubber magnet in the minimum diameter portion of the die guide. Thus, the rubber magnet can be magnetized in such a manner that the rubber magnet can provide a uniform magnetic force distribution over the whole portion thereof. Also, since the magnetizing head and the rubber magnet are in close contact with no clearance between them, the rubber magnet magnetization can be achieved with no loss and thus there can be produced a rubber magnet which has a sufficient magnetic force.

Further, since the inside diameter of the minimum diameter portion of the die guide is set slightly smaller than the inside diameter of the portion of the motor case for mounting the magnet, the rubber magnet can be smoothly inserted from the minimum diameter portion of the die guide into the motor case. Also, because the rubber magnet expands toward the outer periphery thereof due to its own elastic force and is thus detached from the magnetizing portion of the magnetizing head at the instant when it is mounted into the motor case, the rubber magnet can be mounted without being damaged by the magnetizing head.

What is claimed is:

1. A magnet assembling device, comprising:

a rounding die into which a rectangular and flexible rubber magnet can be mounted so that said rubber magnet has an annular shape;

a die guide for guiding said rubber magnet mounted in said rounding die into a motor case;

a push punch including a punching portion for inserting said rubber magnet mounted in said rounding die into said die guide and for pushing said rubber magnet out of said die guide into said motor case; and a magnetizing head including a magnetizing portion for magnetizing an inner peripheral surface of said rubber magnet, wherein said die guide is formed in a tapered shape such that an insertion portion thereof from which said rubber magnet is inserted is larger in an inside diameter dimension than a discharging portion thereof from which said rubber magnet is discharged, and wherein said magnetizing head is mounted on said push punch so that said magnetizing portion of said magnetizing head projects toward said rubber magnet beyond said punching portion, and said magnetizing portion can be brought into close contact with said inner peripheral surface of said rubber magnet in a minimum diameter portion of said die guide.

2. A magnet assembling device as set forth in claim 1, wherein an inside diameter dimension of said minimum diameter portion of said die guide is set slightly smaller than an inside diameter dimension of a portion of said motor case to which said rubber magnet is to be mounted.

* * * * *